United States Patent [19]
Ray

[11] Patent Number: 4,846,137
[45] Date of Patent: Jul. 11, 1989

[54] FUEL HEATER

[76] Inventor: Dennis A. Ray, 317 South Nelson, Crookston, Minn. 56716

[21] Appl. No.: 121,672

[22] Filed: Nov. 17, 1987

[51] Int. Cl.[4] ............................................. F02M 31/00
[52] U.S. Cl. .................................... 123/557; 123/552
[58] Field of Search ............... 123/557, 545, 552, 546, 123/547

[56] References Cited

U.S. PATENT DOCUMENTS

| | | | |
|---|---|---|---|
| 4,338,907 | 7/1982 | Lindbeck | 123/557 |
| 4,367,717 | 1/1983 | Ray | 123/557 |
| 4,527,533 | 7/1985 | Laramee | 123/552 |
| 4,722,314 | 2/1988 | Martinson | 123/557 |

OTHER PUBLICATIONS

The Climate Controller Fuel Ssytem, published in 1984 by Controlled Fuel Systems.

*Primary Examiner*—Willis R. Wolfe
*Assistant Examiner*—M. Macy
*Attorney, Agent, or Firm*—Palmatier & Sjoquist

[57] ABSTRACT

A fuel heating device for an automatic engine including a heat exchanger heating the gasoline from the supply tank before directing the gasoline into the carburetor and utilizing heat from the engine coolant system, the vapor pressure of the heated gasoline being monitored for regulating the flow of engine coolant.

21 Claims, 7 Drawing Sheets

FUEL HEATER

BACKGROUND OF THE INVENTION

This invention relates to internal combustion engines, and more particularly, to devices that preheat fuel for the carburetors of these engines.

It is well known that heating fuel prior to its introduction into the carburetor, increases the combustion efficiency of these engines. There are many obstacles to overcome when designing a fuel heating device. The object of these fuel heaters is to provide the carburetor with fuel that is warmed to a predetermined temperature. The heat output of the fuel heater must be adjustable to satisfy the differing amounts of fuel needed whether the car is idling or accelerating. The heater must also work within a wide range of environmental temperatures and pressures. The heat required from the heater at warm temperatures is much less than the heat required when the outside temperature is below zero.

A related problem that occurs with the use of fuel heaters is vapor lock. Vapor lock occurs when there is partial or complete interruption in the fuel flow and is caused by the formation of bubbles of vaporized gas. When this occurs, the car is virtually useless until the gas cools and the vapors return to their liquid state. If vapor lock occurs with any regularity, the fuel heater will not be accepted by the public.

The fuel heaters must also be inexpensive to manufacture and easy to install. The savings from this device occurs over a long period of time, and many people will not purchase it if there is a large initial investment. The prior art contains many attempts to overcome the problems faced when designing a fuel heater. In U.S. Pat. No. 4,146,002, issued to Quinn, on Mar. 27, 1979, the fuel is heated by passing it through helically-shaped tubing that is surrounded by engine coolant. My prior invention, U.S. Pat. No. 4,367,717, issued Jan. 11, 1983, also utilizes engine coolant to heat the fuel. In my prior invention, the fuel is passed through a heat exchanger which heats and regulates the fuel temperature as it passes into the carburetor. My prior invention, as well as many others, have numerous machined parts and are expensive to manufacture.

The prior art has demonstrated the advantages of using fuel heaters, but has not provided the public with a reliable, inexpensive fuel heater. It is accordingly clear that a need remains in the art for a fuel heater that will overcome the disadvantages of the current fuel heaters.

SUMMARY OF THE INVENTION

An object of this invention is to produce a reliable, inexpensive fuel heater that can be adjusted to fit any type of automobile.

Another object of this invention is to provide a fuel heater that evenly heats the fuel and is capable of providing fuel to the carburetor at a predetermined temperature.

Another object of this invention is to create a device that will enable the internal combustion engine to burn various blends of fuel more efficiently and thereby reduce the amount of unburned fuel that is released into the atmosphere.

Another object of this invention is to provide a fuel heater that is able to provide heated fuel to the carburetor at varying rates of flow and will not create vapor lock.

A feature of this invention is a canister having four concentric walls with attached top and bottom covers. There is also a control head attached to the top of the canister and coolant transfer rings rotatably mounted on the canister. The outer wall of the canister has annular recesses located near each end of it. These annular recesses communicate with the coolant transfer rings to form coolant transfer manifolds. There are also inlet and outlet passages into the interior of the outer wall located on these annular recesses.

Inwardly of the outer wall is a second concentric wall or transfer wall. The heat transfer wall and outer wall cooperate to define an annular coolant flow passage between them. The interior portion of the heat transfer wall has multiple inwardly projecting fins which extend into the heat transfer chamber.

Inwardly of the heat transfer wall is a third concentric wall or core. The core is constructed of an insulating plastic liner which cooperates with the heat transfer wall to form a heat transfer chamber. The plastic liner has upwardly and downwardly projecting extensions which border a pair of fuel reservoirs. Extending into the top recess are a pair of plastic tubes. The first tube is the balance tube which communicates with the control head. The second tube is the pick-up tube which delivers the heated fuel to the fuel outlet.

The fourth concentric wall is a centrally located plastic sleeve. This plastic sleeve surrounds the center bolt and extends from the bottom cover through the core and reservoir and into the control head.

The bottom cover contains a fuel inlet which delivers unheated fuel from the gas tank to the fuel heater. The bottom cover also contains a flow line which connects the fuel inlet to the heat transfer chamber. In this flow line, there is a check valve and a fuel filter which extends into the heat transfer chamber.

The control head attaches to the top of the canister and contains various flow chambers which communicate with the top of the heat transfer chamber. The first chamber is a vapor chamber which extends from the top of the heat transfer chamber to a horizontal vapor passageway. The horizontal vapor passageway extends from the first vapor chamber to the vapor outlet and communicates with the top of the piston chamber and the second vapor chamber. The next vertical chamber is the piston chamber. The bottom of the piston chamber is connected to the top of the balance tube. The piston chamber contains a means for monitoring the vapor pressure in the fuel heater. In one embodiment, this monitoring means is a round ball which raises and lowers according to the fuel level in the piston chamber. When the predetermined vapor pressure is reached, the coolant flow is discontinued until the fuel cools and the vapor pressure decreases. The next chamber is the second vapor chamber. This vapor chamber extends from the heat transfer chamber to the horizontal vapor passageway. The final chamber is the fuel outlet chamber which connects the top of the pickup tube to the fuel outlet.

The coolant transfer rings are rotatably attached to the outer wall of the canister. The coolant rings have an annular recess on their inner periphery which confronts the recess located on the outer periphery of the outer wall and defines a coolant manifold. The top ring contains a coolant inlet which connects to the existing engine coolant system. The bottom coolant ring contains the coolant outlet. The coolant outlet includes a solenoid which is electrically connected to the vapor pressure monitoring means in the control head.

In operation, the fuel enters the bottom of the fuel heater through the fuel inlet. The fuel then passes by the check valve, through a filter and into the heat transfer chamber. In the heat transfer chamber, the fuel is heated by the transfer wall and the plastic liner. When the fuel reaches the top of the heat transfer chamber, the fuel flows to the bottom of the top recess and into either the balance tube or the pick-up tube. The vaporized fuel passes from the top of the heat transfer chamber into the vapor chamber in the control head. From the vapor chamber, the fuel vapor either passes into the top of the piston chamber or out of the fuel heater through a vapor outlet or by mixing with out-going fuel.

The heated fuel in the heat transfer chamber may flow into the bottom of the balance tube or into the bottom of the pick-up tube. When the fuel enters the pick-up tube, it flows up the tube, through the fuel outlet chamber, and then out of the fuel heater through the fuel outlet. If the fuel flows into the balance tube, it flows through a small meshed filter, and up into the piston chamber.

The engine coolant enters the fuel heater through the top coolant ring. The coolant then passes through the coolant manifold, past the annular recess and into the coolant distribution passageway where it heats the heat transfer wall. From the coolant distribution passageway, the coolant flows through the lower annular recess and manifold and finally through the lower coolant ring. The coolant outlet on the lower ring has a solenoid valve in flow communicating relationship with it. The solenoid is controlled by the pressure detecting means located in the piston chamber.

An advantage of the present invention is that the fuel is evenly heated in the heat transfer chamber.

Another advantage of the present invention is that it is self-adjusting and takes into account the blend of the fuel, the outside temperature, and the barometric pressure.

Another advantage of this invention is that it is easily assembled and adjustable to fit in any engine compartment.

Another advantage of this invention is that it holds sufficient heated fuel in reserve so that it easily adjusts to sudden increases in the demand for fuel.

Another advantage of this invention is that it is safe to use and will automatically shut itself off if it is not operating properly.

Another advantage of this invention is that it may have a shut off valve located in the fuel outlet port that is controlled by a vacuum switch which interrupts the electrical circuit causing the valve to close the fuel outlet and allow cold fuel to flow to the engine whenever the engine vacuum drops suddenly, such as when another car is passed.

DESCRIPTION OF THE PREFERRED EMBODIMENT

Figure 1:
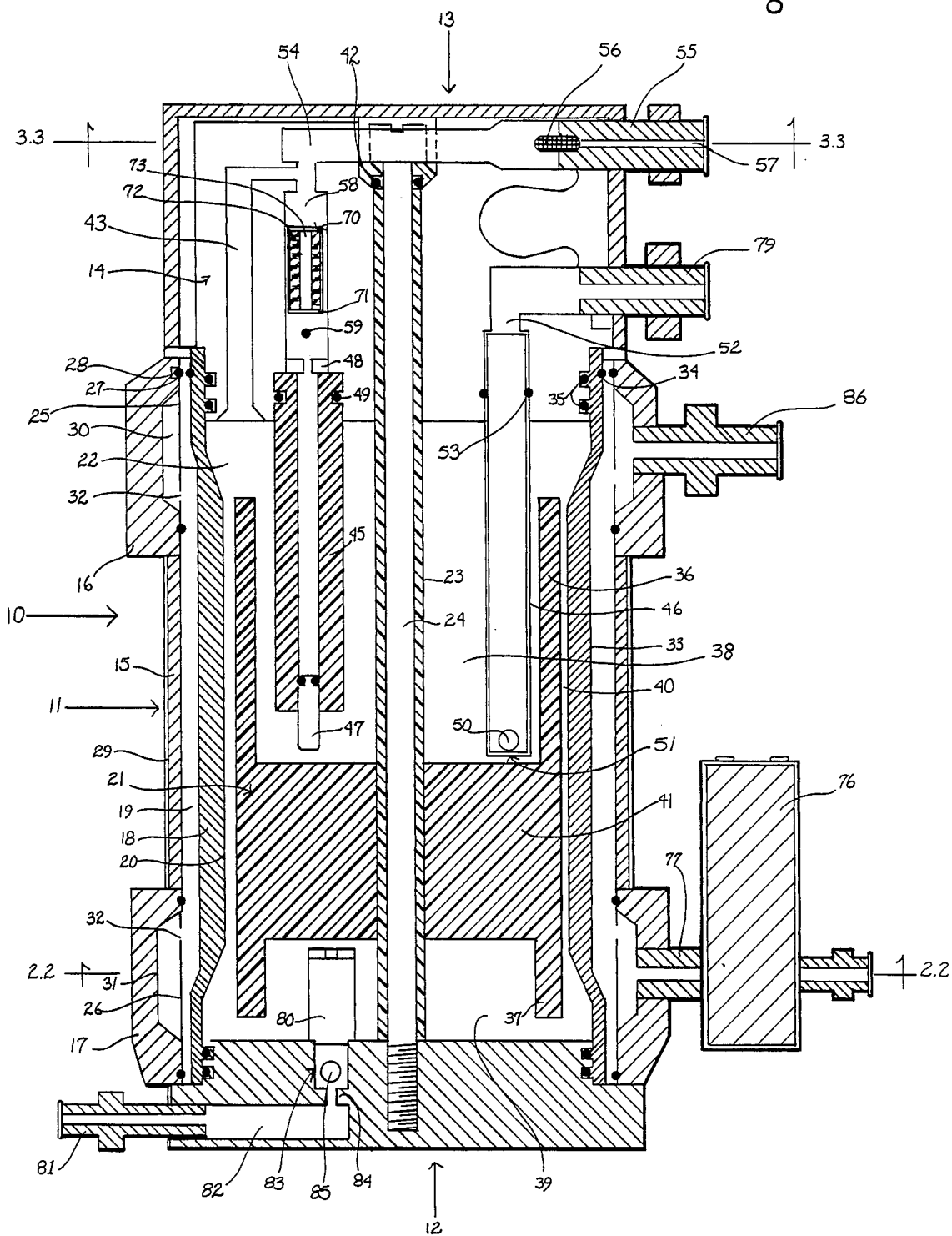
FIG. 1 is a detailed sectional view of the fuel heater taken along line 1—1 of FIG. 2.
Figure 2:
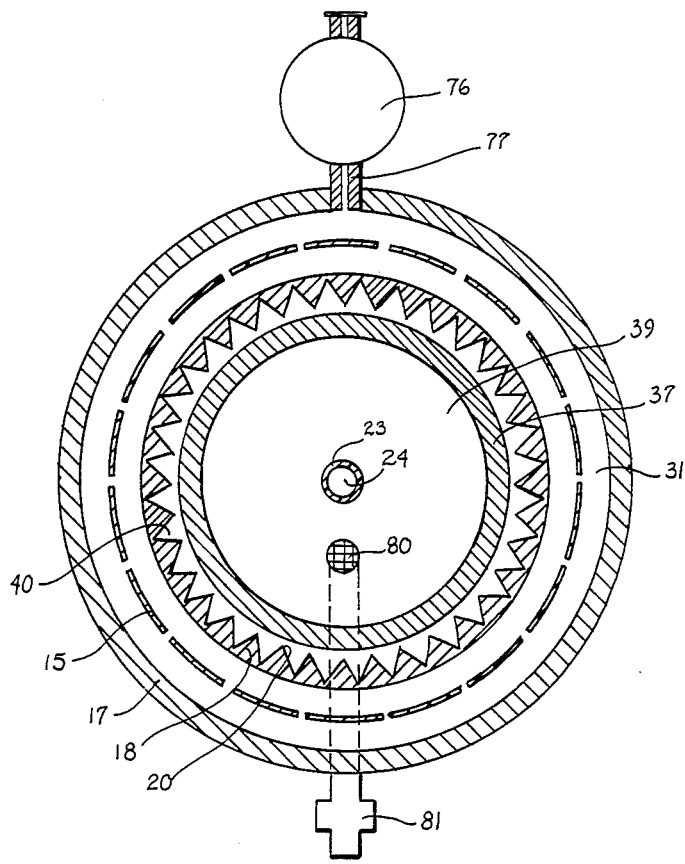
FIG. 2 is a detailed sectional view taken along line 2—2 of FIG. 1.
Figure 3:
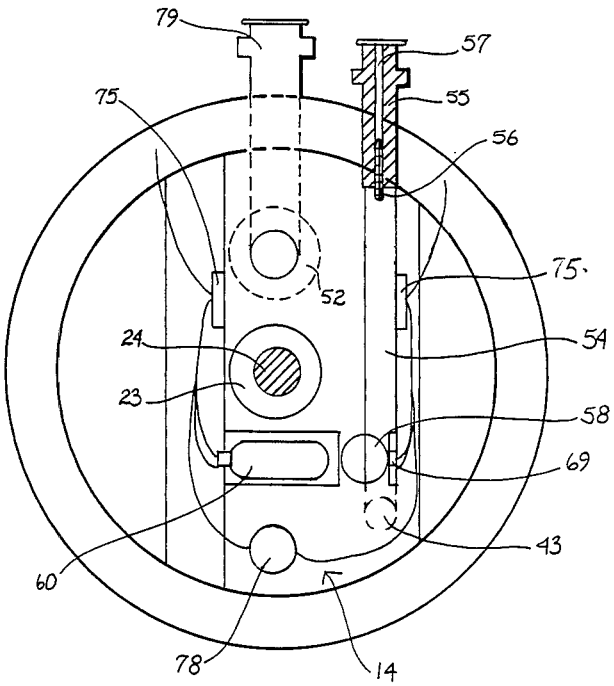
FIG. 3 is a detailed sectional view of the bottom of the control head taken along line 3—3 of FIG. 1.
Figure 4:
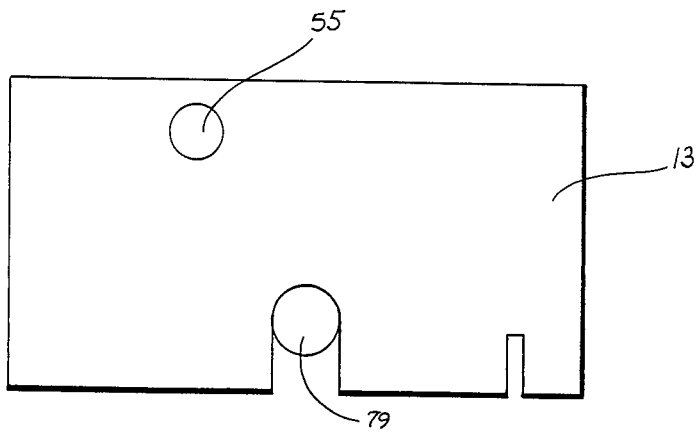
FIG. 4 is a detailed side view of the top cover.
Figure 5:
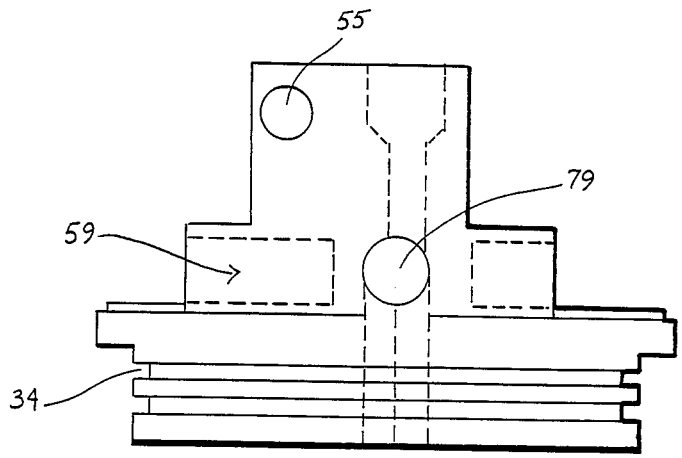
FIG. 5 is a detailed side view of the control head.
Figure 6:
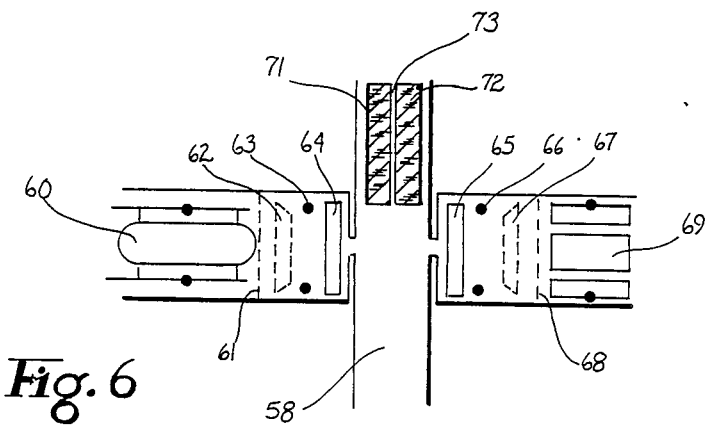
FIG. 6 is an exploded view of the vapor pressure monitoring means.
Figure 7:
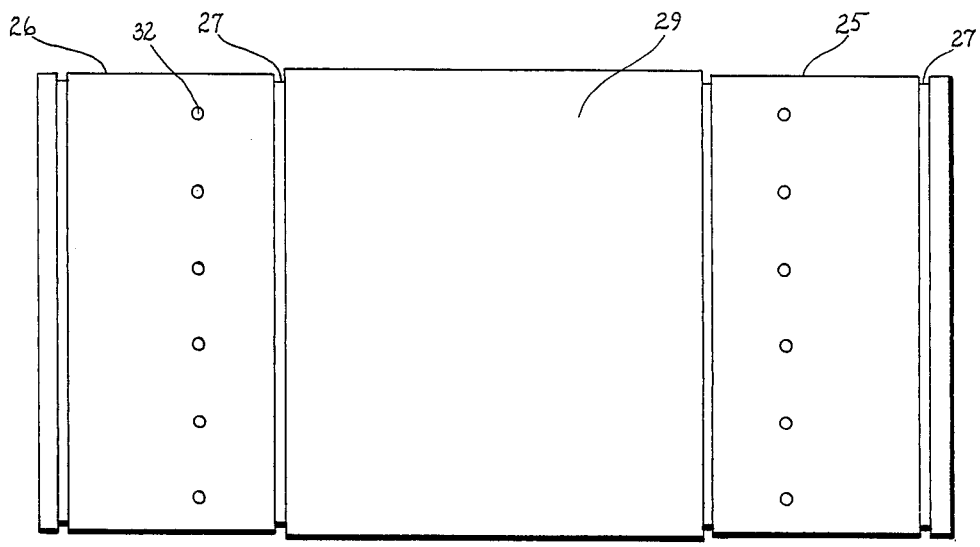
FIG. 7 is a detailed view of the outer wall of the fuel heater.
Figure 8:
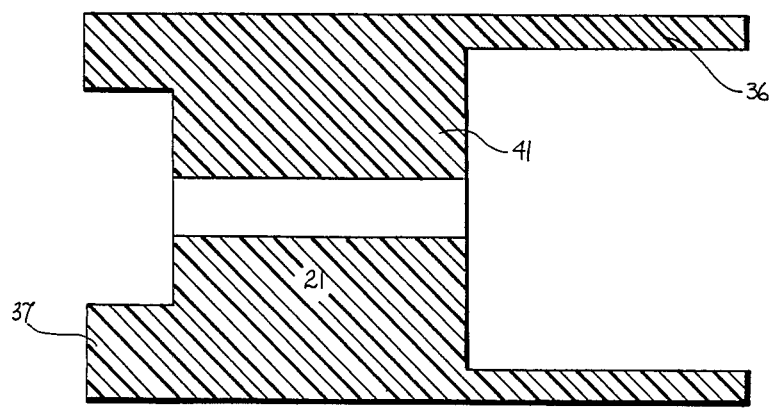
FIG. 8 is a detailed section view of the core wall of the fuel heater.
Figure 9:
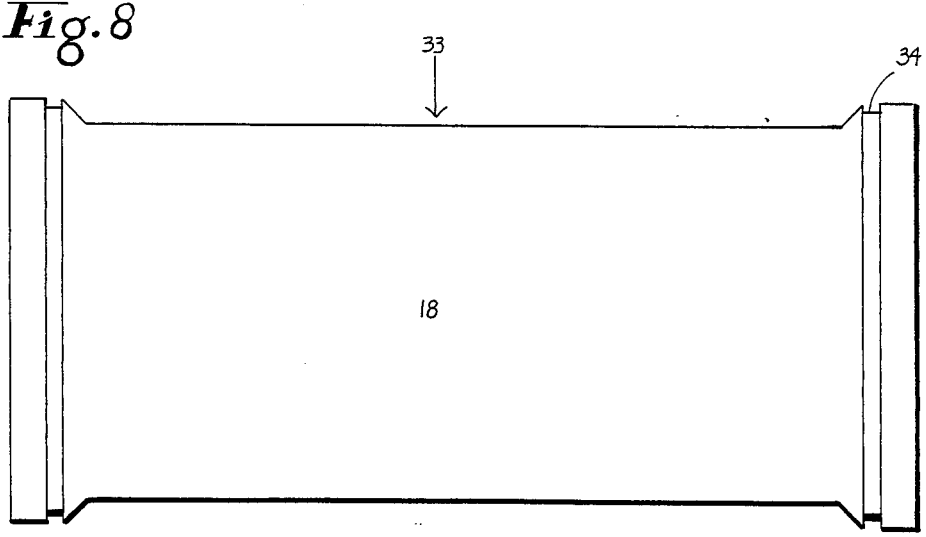
FIG. 9 is a detailed view of the heat transfer wall of the fuel heater.

One form of the improved fuel heater is described herein and is referred to generally as 10. The fuel heater 10 has as its principal parts, an elongate annular canister section 11, a bottom cover 12, a top cover 13 and a control head 14. The canister section 11 consists of four concentric walls. The first concentric wall is the outer wall 15 which extends from the top cover 13 to the bottom cover 12 and has a pair of annular coolant rings 16 and 17 mounted thereon. The next concentric wall is the heat transfer wall 18 which, in combination with the outer wall 15, forms a coolant distribution passageway 19. The inner surface of the heat transfer wall 18 has multiple inwardly projecting fins 20. Located inwardly from the heat transfer wall 18 is the heat transfer core 21 which cooperates with the heat transfer wall 18 to form the heat transfer chamber 22. The final concentric wall is the plastic sleeve 23 which surrounds a center bolt 24 and supports the heat transfer core 21.

The outer wall 15 is an elongate concentric aluminum cylinder which has a pair of top and bottom annular recesses 25 and 26. Above and below these annular recesses 25 and 26 are a pair of concentric grooves 27 into which O-rings 28 are placed to rotatably mount the coolant rings 16 and 17. The coolant rings 16 and 17 are further held in place by a mounting bracket 29 which fits inwardly from the coolant rings 16 and 17 along the outer wall 15. The coolant rings 16 and 17 are rotatably mounted in a communicating relationship with the annular recesses 25 and 26 to form coolant manifolds 30 and 31. The outer wall 15 also contains evenly spaced coolant passages 32 which open into the coolant distribution passageway 19. The outer wall 15 forms a leak proof seal between the top and bottom covers 12 and 13 when the center bolt 24 is tightened.

The next concentric wall is the heat transfer wall 18. This wall is constructed of aluminum and contains an inwardly projecting circumferential recess 33. This circumferential recess 33 cooperates with the inner periphery of the outer wall 15 to define the coolant distribution passageway 19. The end portions of the heat transfer wall 18 have a larger outside diameter so as to slidably fit within the outer wall 15 of the canister section 11. These end portions have an O-ring groove 34 located on their outer surface to provide a tight seal with the inner surface of the outer wall 15. The inner surface of the end portions also has O-ring grooves 35 to allow the heat transfer wall 18 to be fixably attached to the control head 14.

The inner surface of the heat transfer wall 18 contains multiple inwardly projecting fins 20. These fins 22 extend into the heat transfer chamber 22 to interrupt the flow of fuel through the heat transfer chamber. These fins 20 increase the conduction of heat from the heat transfer wall 18 to the fuel by providing a large heat transfer surface.

The third concentric wall is the heat transfer core 21 which is constructed of an insulating plastic to retain heat transferred from the heat transfer wall 18. The core 21 has upwardly and downwardly projecting circular extensions, 36 and 37 respectively, which border the top and bottom fuel reservoirs, 38 and 39, respectively. The outer surfaces of the heat transfer core extensions 36 and 37 are positioned in close proximity to the fins 20 of the heat transfer wall 18 to form a restricted fuel flow passageway 40. The heat transfer core 21 is held in position by the plastic sleeve 23 which is frictionally positioned inside the body 41 of the heat transfer core 21.

The final concentric wall is the inner plastic sleeve 23 which surrounds the center bolt 24. This sleeve 23 extends from the bottom of the heat transfer chamber 22 to the top cover 13 and is held in place by an O-ring and groove assembly 42 in the top cover 13.

The heat transfer chamber 22 is surrounded by the heat transfer wall 18, the bottom cover 12 and the control head assembly 14. The top of the heat transfer chamber 22 contains openings for the vapor chamber 43 and a pair of hollow plastic tubes 45 and 46 which extend downwardly into the top fuel reservoir 38. The first hollow plastic tube is the balance tube 45. This tube fits in close proximity to the inner surface of the upper extension of the heat transfer core 36 and extends downwardly to a position near the body 41 of the heat transfer core 21. The balance tube 45 has a small fuel filter 47 slidably extending from the bottom opening of the balance tube 45. Inwardly from the fuel filter 47 and in flow communicating relation with the hollow passageway of the balance tube 45 is a fuel flow restriction 48. The top of the balance tube 45 is secured in position by an O-ring and groove assembly 49.

The second hollow plastic tube is the pick-up tube 46. This tube fits in close proximity to the inner surface of the upper heat transfer core extension 36 and extends downwardly to a position near the body 41 of the heat transfer core 23. The bottom of the pick-up tube 46 contains a pair of cross port holes 50 and a bottom hole 51 for directing the flow of heated fuel into the fuel outlet chamber 52. The top of the pick-up tube 46 is held in position by an O-ring and groove assembly 53.

The control head 14 is attached to the canister section by an O-ring and groove assembly 35 that fits inside the top end portion of the heat transfer wall 18. The control head 14 is constructed of aluminum and contains three flow chambers in flow communicating relation with the heat transfer chamber 22. The first flow chamber in the control head 14 is a vapor chamber 43 which extends upwardly from the top of the heat transfer chamber 22. The top of this vapor chamber 43 communicates with the top of the piston chamber 58. A horizontal vapor passageway 54 extends from the top of the piston chamber 58, along the top of the control head 14, to the vapor outlet 55. The vapor outlet 55 contains a small mesh filter 56 which slidably fits into the small diameter vapor port 57. The vapor outlet 55 is connected to the fuel tank by a fuel return line.

The next flow chamber in the control head 14 is the piston chamber 58. The piston chamber 58 extends from the top of the balance tube 45 to the horizontal vapor passageway 54. Near the bottom of the piston chamber 58 is an LED eye assembly 59 which consists of a phototransistor 60, a sealing washer 61, a retaining ring 62, an O-ring 63, and a lens 64 on one side of the chamber and a lens 65, an O-ring 66, a second sealing washer 67, a retaining ring 68 and an emitter 69 to detect the light, on the other side of the chamber. Positioned above the LED eye assembly 59 is the piston assembly 70 which moveably floats in the piston chamber 58. The piston assembly 70 is constructed of an outer aluminum shell 71 with an inner cork structure 72 having a centrally located air hole 73 drilled vertically through the assembly 70.

The piston assembly 70 floats at the interface of the vapor and liquid fuel. When the piston assembly blocks the LED eye assembly 59, a series of transistors 75 are tripped and the solenoid valve 76 located on the coolant outlet 77 is closed. As the fuel cools, the vapor pressure will decrease and the piston assembly 70 will rise until the LED eye assembly 59 reopens the solenoid 76.

Additionally, the control head 14 contains a safety mechanism which overrides the LED eye assembly 59 if the assembly is not working properly. The control head 14 contains a thermostatic resistor 78 which monitors the temperature of the control head 14. If the control head 14 reaches a predetermined temperature, the thermostatic resistor 78 will close the solenoid 76 and stop the coolant flow through the fuel heater 10.

The final flow chamber in the control head 14 is the fuel outlet chamber 52. The fuel outlet chamber 52 extends upwardly from the top of the pickup tube 46 to the fuel outlet 79. The fuel outlet 79 then connects to a fuel line to the carburetor.

The top cover 13 is constructed of plastic or aluminum and encloses the control head 14. The top cover 13 has openings for the vapor outlet 55, the fuel outlet 79, and the wires from the LED eye assembly 59, all of which combine to hold the cover in place.

The bottom of the heat transfer chamber 22 contains the downwardly extending core extension 37 of the heat transfer core 21. The wall of this core extension 37 is thicker than the wall of the upper core extension 36 and extends in close proximity to the fins 20 of the heat transfer wall 18 to form the bottom fuel reservoir 39. The bottom fuel reservoir 39 contains a round fuel filter 80 which extends upwardly from the bottom cover 12.

The bottom cover 12 is constructed of aluminum and is connected to the bottom end of the heat transfer wall 18 by tightening the center bolt 24. The bottom cover 12 contains a fuel inlet 81 which communicates with the fuel flow line 82. In the fuel flow line 82 is a check valve 83 which includes a flow restricting seat 84 and a check ball 85.

FIGS. 10–15 illustrate a second preferred embodiment of the fuel heater and is referred to herein generally as 10'. This modified fuel heater 10' includes a modified control head 100 and is designed for use in automobiles whenever it is not practical to install a fuel return line between the fuel heater 10 and the gasoline tank. In this embodiment, the canister section 11 and the bottom cover 12 are designed and operate as previously described. Additionally, the use of a control head insulating ring 101 is illustrated and is adaptable for use with either version of the control head, 14 or 100, to decrease the amount of heat transferred from the canister section 11 of the fuel heater 10 or 10' to the control head 14 or 100.

Figure 10:
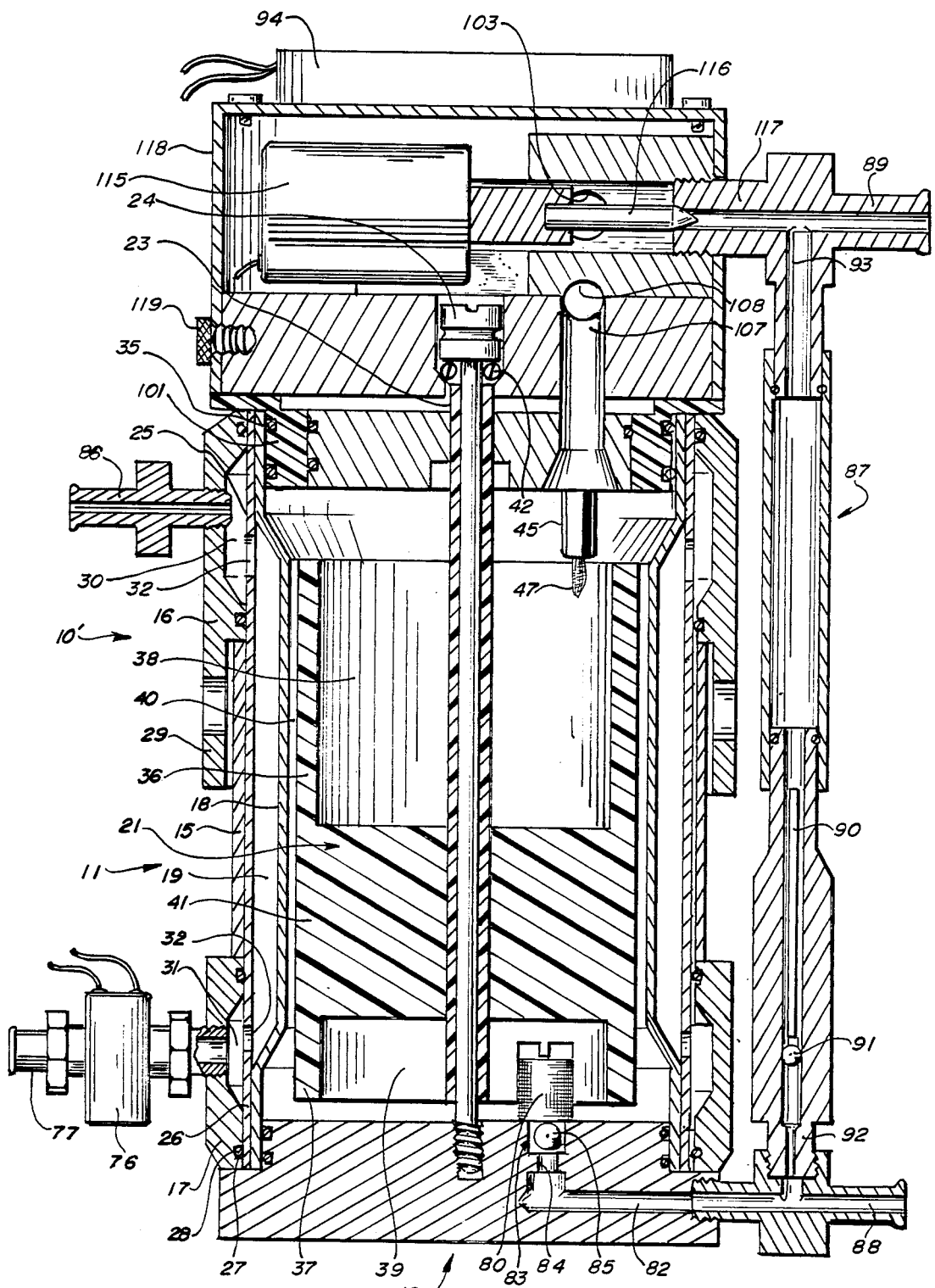
FIG. 10 is a detailed sectional view of an alternate embodiment of the fuel heater.
Figure 11:
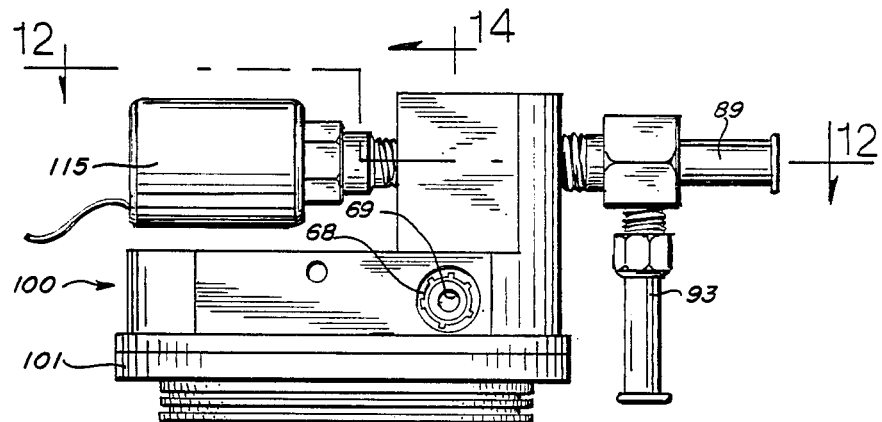
FIG. 11 is a detailed side view of the control head illustrated in FIG. 10.
Figure 12:
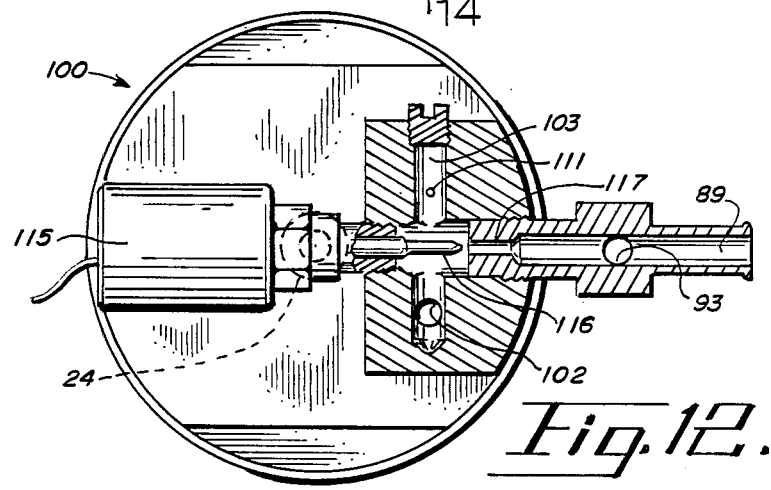
FIG. 12 is a detailed top section view of the control head taken along lines 12—12 of FIG. 11.
Figure 13:
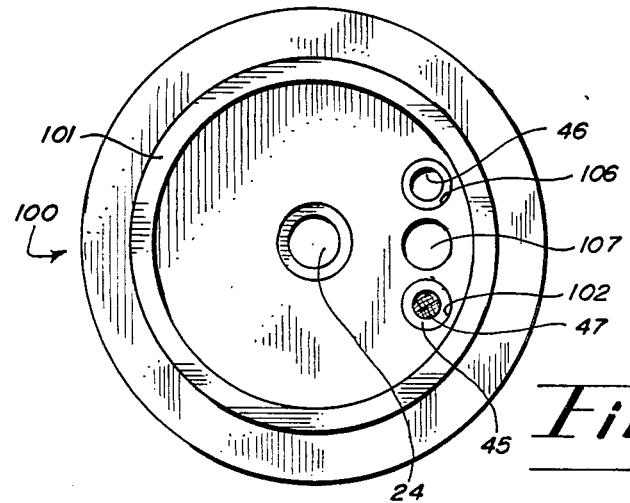
FIG. 13 is a detailed bottom view of the control head illustrated in FIG. 11.
Figure 14:
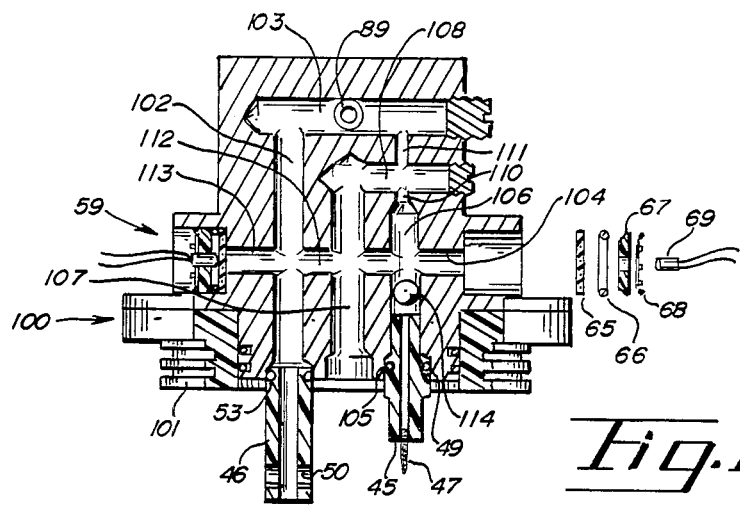
FIG. 14 is an exploded view of the control head taken along lines 13—13 of FIG. 11.
Figure 15:
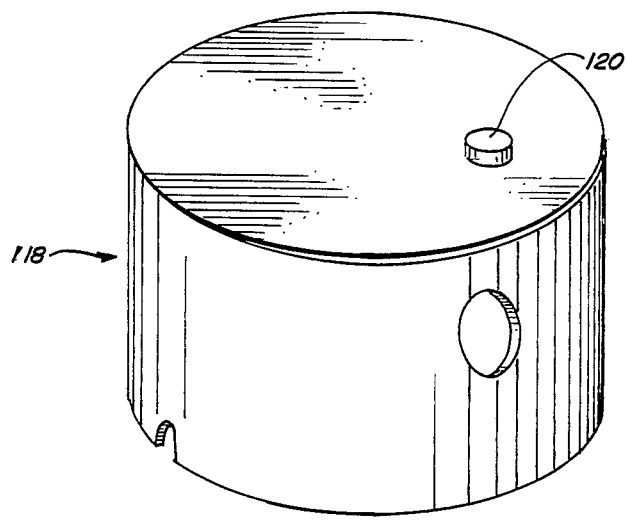
FIG. 15 is a perspective view of the top cover of the alternate embodiment.

As illustrated in FIG. 10, the modified fuel heater 10' includes a cold fuel bypass line 87 which extends from the fuel inlet 88 to the fuel outlet 89. The fuel bypass line 87 includes a weight 90 and a check ball 91 which are movably positioned inside the lower bypass valve 92. The fuel bypass line 87 extends upwardly from the lower bypass valve 92 to the upper bypass valve 93 which is in flow communicating relationship with the fuel outlet 89.

Near the top of the modified fuel heater 10' is a commonly available vacuum switch 94 which electrically monitors the vacuum pressure from the engine. This vacuum switch 94 is in further electrical communication with a solenoid switch 115 located on the control head 100.

As with the first control head 14, the modified control head 100 has three flow chambers in flow communicating relation with the heat transfer chamber 22. The first flow chamber is the fuel outlet chamber 102. The fuel outlet chamber 102 extends upwardly from the top of the pick-up tube 46 to the horizontal fuel passageway 103. A pair of openings 104 and 105 are located in the lower half of the fuel outlet chamber 102 to allow one portion of the LED eye assembly 59 to be positioned adjacent the outer surface of the control head 100 while still monitoring the fuel/vapor level in the piston chamber 106. Fuel is prevented from passing through the outermost opening 104 by the lens 65 of the LED eye assembly 59. Fuel is allowed to pass freely through the innermost opening 105 into the adjacent, vapor chamber 107.

The middle flow chamber is the vapor chamber 107. The vapor chamber 107 extends upwardly from the bottom of the control head 100 to a cross passageway 108, located just beneath the fuel outlet 89. The cross passageway 108 extends horizontally above the top of the piston chamber 106 and is in flow communicating relation with the top of the piston chamber 106 and the horizontal fuel passageway 103 through a pair of restrictive passageways, 110 and 111, respectively. A pair of openings 105 and 112 are located in the lower half of the vapor chamber 107 to allow the LED eye assembly 59 to monitor the fuel/vapor level in the piston chamber 106. These openings 105 and 112 further allow fuel and vapor to pass freely between the respective flow chambers.

The final flow chamber is the piston chamber 106. The piston chamber 106 extends upwardly from the top of the balance tube 45 to the lower restrictive passageway 110. Near the midpoint of the piston chamber 106 are the openings 112 and 113 for the LED eye assembly 59. As in the fuel outlet chamber 102, the outermost opening 113 contains a lens 64 to prevent fuel from passing through the outmost opening 113, while fuel or vapor is allowed to freely pass through the innermost opening 112.

The piston chamber 106 contains a piston assembly 114 which is preferably a round ball constructed of cork. In the modified control head 100, fuel and vapor freely passes through the inner openings 105 and 112 into the piston chamber 106. Vapors also pass downwardly from the cross passageway 108, through the lower restrictive passageway 110 and into the top of the piston chamber 106 to exert downward vapor pressure on the piston assembly 114. A steady flow of vapor also passes from the vapor chamber 107, through the cross passageway 108, upwardly through the upper restrictive passageway 111 and into the horizontal fuel passageway 103. The use of the upper restrictive passageway 111 allows a steady amount of vapor to mix with the out-going fuel thereby eliminating the need for a fuel return line.

The solenoid switch 115 is positioned perpendicular to the horizontal fuel passageway 103 and includes a needle 116 which is in-line with the opening 117 for the fuel outlet 89. Whenever there is a sudden increase in demand for fuel, such as when the accelerator pedal is floored, the vacuum switch 94 cuts off the power to the solenoid switch 115 thereby releasing the needle 116 from its normal operating position. The demand for fuel pulls the needle 116 forward to block the opening 117 of the fuel outlet 89. This in turn, creates an upward pressure in the cold fuel bypass line 87 which raises the weight 90 and check ball 91 to allow cold fuel to bypass the fuel heater 10, and flow to the carburetor.

The modified top cover 118 may be constructed of plastic or aluminum and encloses the modified control head 100. The top cover 118 has openings for the fuel outlet 89 and the wires from the LED eye assembly 59 and the vacuum switch 94 and is held in place by a screw 119. Additionally, an indicator light 119 may be positioned on the top of the top cover 118. This indicator light 119 is electrically connected to the wires from the LED eye assembly 59 by a transistor (not shown) to provide an external indicator to indicate when the fuel heater 10 is in operation.

Both embodiments operate in the same general manner and therefore even though the following discussion is directed to the first embodiment, the discussion is equally applicable to the second embodiment. In operation, the fuel enters the fuel heater 10 through a fuel inlet 81 located in the bottom cover 12. The fuel flows through the fuel flow line 82 and past the check valve 83 to prevent the fuel from flowing out of this end of the fuel heater 10. From the check valve 83, the fuel flows from the bottom cover 12 into the round fuel filter 80 which extends into the bottom fuel reservoir 39 of the heat transfer chamber 22.

In the heat transfer chamber 22, the fuel flows from the round fuel filter 80, around the downward extensions of the core 37 and into the restricted fuel flow passageway 40. As the fuel passes through the restricted fuel flow passageway 40, it is heated by the fins 20 of the heat transfer wall 18. The fuel then passes around the upper extension of the core 36 and flows into the top fuel reservoir 38. The vaporized fuel rises into the vapor chamber 43 where it enters the top of the piston chamber 58 and then out of the vapor outlet 55. The small diameter of the vapor port 57 allows a steady flow of vapor to return to the fuel tank through a fuel return line (not shown). Vapor also remains in the horizontal vapor passageway 54 to exert a downward pressure on the piston assembly 70 in the piston chamber 58.

Once the fuel is in the top fuel reservoir 38, it enters either the balance tube 45 or the pick-up tube 46. If the fuel enters the bottom of the pick-up tube 46, it passes through the cross port holes 50 or the bottom hole 51. The fuel flows up the pick-up tube 46 and enters the fuel outlet chamber 52. From the fuel outlet chamber 52, the fuel flows through the fuel outlet 79 to the carburetor.

If the fuel enters the balance tube 45, it passes through a small fuel filter 47 and past a flow restriction 48 which act, in combination, to limit the amount of the fuel entering the balance tube 45. From the top of the balance tube 45 the fuel enters the bottom of the piston chamber 58 and passes by the LED eye assembly 59. The liquid fuel flows up the piston chamber 58 until it is in equilibrium with the downward pressing vaporized fuel.

The coolant flows from the engine coolant system to the coolant inlet 86. The coolant passes from the inlet 86, through the top coolant ring 16 and into the top coolant manifold 30. From the top coolant manifold 30, the coolant flows through the coolant passages 32 on the outer wall 15 and into the coolant distribution passageway 19. In the coolant distribution passageway 19 the coolant heats the heat transfer wall 18. The coolant then flows down the coolant distribution passageway 19, through the lower coolant passages 32 and into the bottom coolant manifold 31. From this manifold 31, the coolant flows through the lower coolant ring 17 and into the coolant outlet 77. The coolant outlet 77 contains a solenoid 76 which regulates the flow of coolant into the fuel heater 10 by monitoring the vapor pressure of the fuel in the control head 14 or 100. From the solenoid 76, the coolant returns to the engine coolant system.

The operation of this fuel heater 10 provides, as its primary advantages, fuel economy and decreased fuel emissions. Additionally, this invention is easy to manufacture and safe to operate. The use of the vapor pressure monitoring means provides a fuel heater 10 that adjusts itself according to the fuel pressure, barometric pressure and the blend of gasoline used in the automobile.

I claim:

1. A fuel heating attachment for heating fuel with hot engine coolant, comprising
    an elongate canister having an annular side wall with ends upon which transverse top and bottom covers are affixed,
    an elongate annular heat transfer wall affixed within the canister and extending from the top cover to the bottom cover and along and in spaced relation to the annular side wall to define an engine coolant distribution passageway therebetween,
    an elongate annular core affixed within the canister and in spaced relation to the heat transfer wall to define a heat transfer chamber therebetween,
    a fuel inlet on the fuel heater for directing fuel from the fuel pump to the heat transfer chamber,
    a fuel outlet on the fuel heater for directing fuel from the heat transfer chamber to the carburetor,
    a coolant inlet on the fuel heater for directing coolant from the engine coolant system into the coolant distribution passageway of the fuel heater,
    a coolant outlet on the fuel heater for directing the coolant from the coolant distribution passageway to the engine coolant system,
    a flow valve in flow communication with the engine coolant to regulate the flow of coolant,
    the fuel heater containing a vapor pressure monitoring means for monitoring the vapor pressure of the fuel in the fuel heater, and
    said vapor pressure monitoring means controlling the flow valve to regulate the flow of coolant, the vapor pressure monitoring means electrically indicating the vapor pressure to the flow valve.

2. The fuel heater of claim 1, wherein the vapor pressure monitoring means is located in the top cover and includes a vapor outlet in flow communication with the vapor pressure monitoring means.

3. The fuel heater of claim 1, wherein the flow valve is always closed until it is signaled to open by the vapor pressure monitoring means.

4. The fuel heater of claim 1, wherein the vapor pressure monitoring means is an LED eye assembly.

5. The fuel heater of claim 1, wherein the vapor pressure monitoring means includes a float assembly.

6. The fuel heater of claim 1, wherein the flow valve is further controlled by a temperature sensing means.

7. The fuel heater of claim 1, wherein the heat transfer chamber contains multiple projections therein.

8. The fuel heating attachment for heating fuel with hot engine coolant, comprising
    an elongate canister having an annular side wall with ends upon which transverse top and bottom covers are affixed,
    an elongate annular heat transfer wall affixed within the canister and extending from the top cover to the bottom cover and along and in spaced relation to the annular side wall to define an engine coolant distribution passageway therebetween,
    an elongate annular core affixed within the canister and in spaced relation to the heat transfer wall to define a heat transfer chamber therebetween,
    a fuel inlet on the fuel heater for directing fuel from the fuel pump the heat transfer chamber,
    a fuel outlet on the fuel heater for directing fuel from the heat transfer chamber to the carburetor,
    a coolant inlet on the fuel heater for directing coolant from the engine coolant system into the coolant distribution passageway,
    a coolant outlet on the fuel heater for directing the coolant from the coolant distribution passageway to the engine coolant system,
    said annular core having elongate extensions to form a fuel reservoir therein, said fuel reservoir containing an elongate tube in flow communicating relation with the fuel outlet, and
    said tube extending along and in spaced relation to the elongate extensions and opening at the bottom of said fuel reservoir.

9. The fuel heater of claim 8, wherein the annular core has a plurality of elongate extensions forming a top and bottom fuel reservoir.

10. The fuel heater of claim 9, wherein the heat transfer chamber has multiple projections therein to increase the transfer of the coolant heat to the fuel.

11. The fuel heater of claim 8, wherein a vapor pressure monitoring means controls the flow of the coolant through said coolant outlet.

12. The fuel heater of claim 11, wherein said vapor pressure monitoring means includes an LED eye assembly.

13. The fuel heater of claim 11, wherein said vapor pressure monitoring means includes a vacuum switch in electrical communication with said coolant outlet.

14. The fuel heater of claim 13, wherein said vacuum switch controls the flow of fuel through said fuel outlet.

15. An engine attachment for heating fuel with hot engine coolant, comprising
    an elongate canister having an annular side wall with ends upon which transverse top and bottom covers are affixed,
    an elongate heat transfer wall affixed within the canister and extending from the top cover to the bottom cover along and in spaced relation to the annular side wall to define an engine coolant distribution passageway therebetween, an elongate annular core affixed within the canister and in spaced relation to the heat transfer wall to define a heat transfer chamber therebetween, a fuel inlet on the fuel heater for directing fuel from the fuel pump to the heat transfer chamber, a fuel outlet on the fuel heater for directing fuel from the heat transfer chamber to the carburetor, a coolant inlet on the fuel heater for directing coolant from the engine coolant system to the coolant distribution passageway of the fuel heater, a coolant outlet on the fuel heater for directing coolant from the coolant distribution passageway to the engine coolant system, said coolant inlet positioned on the opposite end of the canister as the coolant outlet, and a pressure monitoring means in flow communicating relation with the fuel outlet.

16. The fuel heater of claim 15, wherein the coolant inlet and outlet are separated by a mounting bracket rotatably mounted therebetween.

17. The fuel heater of claim 15, wherein the fuel inlet is positioned on the end of the fuel heater nearest the coolant outlet, and said fuel inlet being positioned on the end opposite the fuel outlet.

18. The fuel heater of claim 15, wherein the engine attachment includes a flow valve in flow communicating relation with the coolant.

19. The fuel heater of claim 18, wherein the fuel heater contains a vapor pressure monitoring means for controlling the flow valve.

20. The fuel heater of claim 15, wherein the pressure monitoring means is a vacuum switch.

21. An engine attachment for heating fuel with hot engine coolant, comprising an elongate canister having an annular side wall with ends upon which transverse top and bottom covers are affixed, an elongate annular heat transfer wall affixed within the canister and extending from the top cover to the bottom cover and along and in spaced relation to the annular side wall to define an engine coolant distribution passageway therebetween, an elongate annular core affixed within the canister and in spaced relation to the heat transfer wall to define a heat transfer chamber therebetween, a fuel inlet on the fuel heater for directing fuel from the fuel pump to the heat transfer chamber, a fuel outlet on the fuel heater for directing fuel from the heat transfer chamber to the carburetor, a coolant inlet on the fuel heater for directing engine coolant from the engine coolant system to the coolant distribution passageway, a coolant outlet on the fuel heater for directing coolant from the coolant distribution passageway to the engine coolant system, a flow valve in flow communication with the engine coolant to regulate the flow of coolant, a vapor pressure monitoring means in flow communication with the fuel for monitoring the vapor pressure of the fuel, said vapor pressure monitoring means controlling the flow valve, said annular core having elongate extensions to form a fuel reservoir therebetween, and a pressure monitoring means being in flow communicating relation with said fuel outlet.

* * * * *